US009934106B1

(12) United States Patent
Amarnath et al.

(10) Patent No.: US 9,934,106 B1
(45) Date of Patent: Apr. 3, 2018

(54) HANDLING BACKUPS WHEN TARGET STORAGE IS UNAVAILABLE

(71) Applicant: EMC Corporation, Hopkinton, MA (US)

(72) Inventors: Mohan Amarnath, Bangalore (IN); Mahipat Rao Kulkarni, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 110 days.

(21) Appl. No.: 14/749,958

(22) Filed: Jun. 25, 2015

(51) Int. Cl.
*G06F 11/14* (2006.01)

(52) U.S. Cl.
CPC ...... *G06F 11/1456* (2013.01); *G06F 11/1464* (2013.01)

(58) Field of Classification Search
CPC .............. G06F 11/142; G06F 11/1435; G06F 11/1453; G06F 11/1456; G06F 11/1458; G06F 11/1466
See application file for complete search history.

(56) References Cited

U.S. PATENT DOCUMENTS

| 5,857,208 A * | 1/1999 | Ofek ................... G06F 11/1451 707/999.202 |
| 7,627,776 B2 * | 12/2009 | Petruzzo ............. G06F 11/1456 711/162 |
| 8,028,106 B2 * | 9/2011 | Bondurant ............ G06F 3/0608 710/62 |
| 8,275,983 B2 * | 9/2012 | Hung ................... G06F 11/1435 711/170 |
| 8,369,968 B2 * | 2/2013 | Brown ................ H04L 67/1095 700/82 |
| 8,484,464 B2 * | 7/2013 | Brown ..................... G06F 21/86 707/668 |
| 2006/0089954 A1 * | 4/2006 | Anschutz ............. G06F 11/1453 |
| 2011/0238626 A1 * | 9/2011 | Hao ..................... G06F 11/1458 707/644 |
| 2015/0331759 A1 * | 11/2015 | Brettell ............... G06F 11/1464 707/640 |

* cited by examiner

*Primary Examiner* — Joseph R Kudirka
(74) *Attorney, Agent, or Firm* — Dergosits & Noah LLP; Todd A. Noah (57) ABSTRACT

Handling backups when target storage is unavailable is described. A system determines whether the target storage is unavailable for storing any backup file for a client. The system determines whether a backup file is created for the client if the target storage is unavailable for storing any backup file for the client. The system stores the backup file in a memory of a computer if the backup file is created for the client, wherein the computer differs from the target storage and differs from the client. The system determines whether the target storage is available for storing the backup file for the client. The system transfers the backup file from the memory of the computer to the target storage if the target storage is available for storing the backup file for the client.

20 Claims, 3 Drawing Sheets

HANDLING BACKUPS WHEN TARGET STORAGE IS UNAVAILABLE

BACKGROUND

If a software error corrupts a data object, or if erroneous data updates the data object, a data protection administrator may restore the data object to a previous state that does not include the corrupted or erroneous data. A backup/restore application executes a backup operation either occasionally or continuously to enable this restoration, storing a copy of each desired data object state (such as the values of data and these values' embedding in a database's data structures) within dedicated backup files. When the data protection administrator decides to return the data object to a previous state, the data protection administrator specifies the desired previous state by identifying a desired point in time when the data object was in this state, and instructs the backup/restore application to execute a restore operation to restore a copy of the corresponding backup files for that state to the data object.

A data object may be stored on a storage array, which is a disk storage system that includes multiple disk drives. Unlike a disk enclosure, a storage array has cache memory and advanced functionality, such as virtualization and Redundant Array of Independent Disks (RAID). A data protection administrator may manage a backup/restore application to create backups files of data objects and store the backup files of data objects on multiple storage arrays.

DETAILED DESCRIPTION

A backup/restore application may perform many activities to handle and manage data and backup files, such as daily maintenance activities that validate the data stored in target storage, which is non-volatile storage used for storing backup files for clients. Examples of daily maintenance activities that require a write-only mode for the target storage are asynchronous crunching, or defragmentation, which aligns data stored on a disk for easier and faster access, and garbage collection, which eliminates deleted data and unused data (such as expired retention backup files) from the target storage. The write-only mode for the target storage, which may be referred to as a blackout window, does not prevent the restoration of backup files stored in target storage to their corresponding clients. However, both administrative activities and the storing of backup files in the target storage are suspended during the blackout window, which may last as long as four hours to clean and flush out fragmented data, repair disk sectors, and eliminate holes in the target storage. If a backup operation was already in progress when a blackout window begins, the backup operation may be allowed to complete, provided that the backup operation does not fill the target storage beyond a threshold level, such as 85% of total capacity. A blackout window may increase in duration as the capacity of the target storage increases and/or as the number of clients backed up increases. Furthermore, a client located in a different time zone from the target storage may not be able to back up its data if the client's scheduled backup operations occur during the target storage's blackout window. A client that changes a significant amount of its data during a blackout window is at risk for losing all of the changed data because backup files of the client's changed data cannot be stored in the target storage during the blackout window.

Embodiments herein handle backups when target storage is unavailable. A determination is made whether the target storage is unavailable for storing any backup file for a client. A determination is made whether a backup file is created for the client if the target storage is unavailable for storing any backup file for the client. The backup file is stored in a memory of a computer if the backup file is created for the client, wherein the computer differs from the target storage and the client. A determination is made whether the target storage is available for storing the backup file for the client. The backup file is transferred from the memory of the computer to the target storage if the target storage is available for storing the backup file for the client.

For example, a backup agent determines whether a blackout window has begun for writing data to a storage array. The backup agent determines whether a backup file is created for a laptop computer when a blackout window is in effect for the storage array. The backup agent stores the backup file in the memory of the server that executes the backup agent if the backup file is created for the laptop computer when the blackout window is in effect for the storage array. The backup agent determines whether the blackout window has expired for the storage array. The backup agent transfers the backup file from the server's memory to the storage array when the blackout window expires for the storage array. The backup agent overcomes the legacy problem of being unable to store backup files for clients during blackout windows for target storage.

Figure 1:
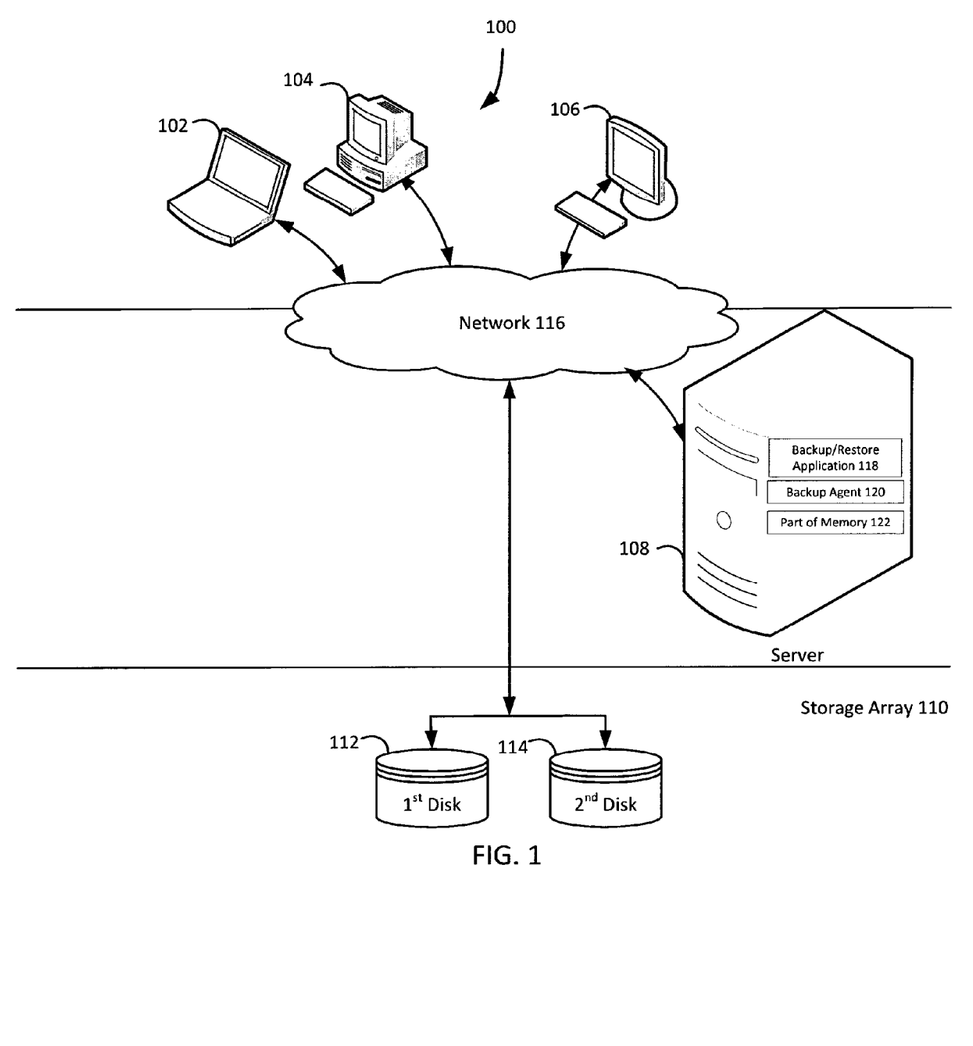
FIG. 1 illustrates a block diagram of an example system for handling backups when target storage is unavailable, under an embodiment.

FIG. 1 illustrates a diagram of a system that implements handling backups when target storage is unavailable, under an embodiment. As shown in FIG. 1, a system 100 may illustrate a cloud computing environment in which data, applications, services, and other resources are stored and delivered through shared data-centers and appear as a single point of access for the users. The system 100 may also represent any other type of distributed computer network environment in which servers control the storage and distribution of resources and services for different client users.

In an embodiment, the system 100 represents a cloud computing system that includes a first client 102, a second client 104, and a third client 106; and a server 108 and a storage array 110 that may be provided by a hosting company. Although FIG. 1 depicts the first client 102 as a laptop computer 102, the second client 104 as a personal computer 104, and the third client 106 as an iMac® 106, each of the clients 102-106 may be any type of computer, including a server. The storage array 110 includes a first disk 112 and a second disk 114. The clients 102-106, the server 108, and the storage array 110 communicate via a network 116. Although FIG. 1 depicts the system 100 with three clients 102-106, one server 108, one storage array 110, two disks 112-114, and one network 116, the system 100 may include any number of clients 102-106, any number of servers 108, any number of storage arrays 110, any number of disks 112-114, and any number of networks 116. The clients 102-106 and the server 108 may each be substantially similar to the system 300 depicted in FIG. 3 and described below.

The server 108 includes a backup/restore application 118 that creates backup files of data objects for the clients 102-106, and executes a rollback based on the backup files. The backup/restore application 118 provides centralized administration, such as scheduling, monitoring, and managing backup operations and backup files. The backup/restore application 118 enables the storing of backup operation schedules, client policies, and client configurations. The backup/restore application 118 provides a unique interface to the clients 102-106 during login, and assists the server 108 in authenticating and registering the clients 102-106. The backup/restore application 118 sends backup/restore work orders to the clients 102-106, which receive and process the work orders to start a backup or restore operation. The backup/restore application 118 maintains a local database of all processes that execute on the server 108. The backup/restore application 118 executes server-side processes for a system administrator's graphical management console, which enable the system administrator to use command line interface tools for queries. For example, a system administrator identifies the clients 102-106 registered with the server 108 and queries the number of checkpoints that are validated in the server 108.

The server 108 includes a backup agent 120 which enables the local storing in a part of a memory 122 of backup files for the clients 102-106 when the storage array 110 is unavailable for storing any backup files for the clients 102-106. The backup agent 120 is an intelligent light weight daemon process which runs in the background of the server 108 during the blackout window for the storage array 110. The backup agent 120 may be a separate component from the backup/restore application 118 or an integrated module within the backup/restore application 118. Although FIG. 1 depicts the backup/restore application 118 and the backup agent 120 residing completely on the server 108, the backup/restore application 118 and the backup agent 120 may reside in any combination of partially on the server 108 and partially on the clients 102-106. Even though the following paragraphs describe EMC Corporation's Avamar® backup/restore application and EMC Corporation's NetWorker® backup/restore application as examples of the backup/restore application 118, the backup/restore application 118 may be any other backup/restore application which provides the backup/restore functionalities described in the Background section.

The backup/restore application 118 may be EMC Corporation's Avamar® backup/restore application, which provides fast, efficient backup and recovery through a complete software and hardware solution. Equipped with integrated variable-length deduplication technology, EMC Corporation's Avamar® backup/restore application facilitates fast, periodic full backups for virtual environments, remote offices, enterprise applications, network access servers, and desktops/laptops. Data deduplication significantly reduces backup time by only storing unique periodic changes, while always maintaining periodic full backups for immediate single-step restore. The transmission of deduplicated backup sends only changed blocks, reducing network traffic. EMC Corporation's Avamar® backup/restore application leverages existing local area network and wide area network bandwidth for enterprise-wide and remote/branch office backup and recovery. Every backup is a full backup, which makes it easy for users to browse, point, and click for a single-step recovery. EMC Corporation's Avamar® data store features redundant power and networking, redundant array of independent disks, and redundant array of inexpensive nodes technology to provide uninterrupted data accessibility. Periodic data systems checks ensure recoverability whenever needed. EMC Corporation's Avamar® systems can be deployed in an integrated solution with EMC Corporation's Data Domain® systems for high-speed backup and recovery of specific data types.

The backup/restore application 118 may be an EMC Corporation's NetWorker® backup/restore application, which is a suite of enterprise level data protection software that unifies and automates backup to tape, disk-based, and flash-based storage media across physical and virtual environments for granular and disaster recovery. Cross-platform support is provided for many environments, including Microsoft Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups. The core NetWorker® software backs up client file systems and operating system environments. Add-on database and application modules provide backup services for products such as Microsoft® Exchange Server. Client backup data can be sent to a remote NetWorker® storage node or stored on a locally attached device by the use of a dedicated storage node. EMC Corporation's NetWorker® modules for Microsoft® applications supports Microsoft® products such as Microsoft® Exchange, Microsoft® Sharepoint, Microsoft® SQL Server, and Microsoft® Hyper-V servers.

The backup agent 120 determines whether the target storage is unavailable for storing any backup file for a client. For example, the backup agent 120 determines whether a blackout window has begun for writing data to the storage array 110. If the target storage is unavailable for storing any backup file for the client, the backup agent 120 checks for backup file creation. If the target storage is still available for storing any backup file for the client, the backup agent 120 continues checking for the target storage's unavailability for storing client backup files.

If the target storage is unavailable for storing any backup file for a client, the backup agent 120 can reserve a part of the memory in a computer for storing a backup file based on information from processes that use the memory. For example, the backup agent 120 reserves enough of the memory 122 in the server 108 to enable the streaming of a client backup file for storing or restoring, while retaining sufficient memory in the server 108 to maintain the functioning of other server processes. The backup agent 120 can retrieve the information required for such memory allocation from a special file system in a Unix-like operating system, such as Procfs:procfs. The special file system can provide process information and other system information in a hierarchical file-like structure which provides a more convenient and standardized method for dynamically accessing process data held in a kernel than the conventional tracing method or than via direct access to kernel memory. Typically, the special file system is mapped to a mount point named/proc at boot time, and acts as an interface to internal data structures in the kernel, thereby enabling the changing of certain kernel parameters at runtime.

If the target storage is unavailable for storing any backup file for a client, the backup agent 120 collects information from the backup/restore application 118 to determine which of the clients 102-106 are registered with the backup/restore application 118, and then requests the backup/restore application 118 to redirect all backup files for the clients 102-106 that are registered to the backup agent 120. The backup/restore application 118 responds to this request by creating backup operation work orders for the clients 102-106 that are registered to identify priorities for any created backup files, and then instructs the clients 102-106 that are registered to send any created backup files to the backup agent 120.

If the target storage is unavailable for storing any backup file for a client, the backup agent 120 determines whether a backup file is created for the client. For example, the backup/restore application 118 instructs the clients 102-106 that are registered to provide any backup file to the backup agent 120 via an encrypted channel on ports 29001 and 29002, and the backup agent 120 determines whether a backup file is created for the laptop computer 102 when the blackout window is in effect for the storage array 110. If a backup file is created for a client, the backup agent 120 handles the created backup file, first by creating an input/output fence so that no data will be written to the storage array 110 until the blackout window expires for the storage array 110, and by fencing out other processes from accessing the part of the memory 122 reserved for temporarily storing any backup files. If a backup file is not created for a client, the backup agent 120 continues checking for the creation of a backup file during the blackout window.

If a backup file is created for a client, the backup agent 120 stores the backup file in a memory of a computer which differs from the target storage and the client. For example, the backup agent 120 spawns a process to handle a backup file created during the blackout window for the storage array 110, verifies that the size of the backup file is not too large for storing in the part of the memory 122, and stores the backup file, and metadata associated with the backup file, in the part of the memory 122 of the server 108 that executes the backup agent 120. The backup files may be limited to incremental backup files rather than the larger full backup files, thereby enabling the part of the memory 122 to store backup files for as many of the clients 102-106 as possible. Due to the limits on the size of the part of the memory 122, storing backup files during a blackout window may be an option that is reserved for customers who pay a premium to have their high rate of data change protected for their client(s), with the size of each backup file limited to a maximum size based on the premium paid. Similarly, the number of backup files handled and the number of clients supported may be limited based on the size of the part of the memory 122 reserved.

After a backup file is stored in a memory of a computer which differs from the target storage and a client, the backup agent 120 can acknowledge receipt of the backup file from the client and can break a communication session with the client. For example, the backup agent 120 acknowledges receipt of a backup file from the laptop computer 102, and breaks the communication session via the encrypted channel on ports 29001 and 29002 with the laptop computer 102.

After a backup file is stored in a memory of a computer which differs from the target storage and a client, the backup agent 120 determines whether the target storage is available for storing the backup file for the client. For example, the backup agent 120 determines whether the blackout window has expired for the storage array 110. If the target storage is available for storing the backup file for the client, the backup agent 120 transfers the backup file to the target storage. If the target storage is still unavailable for storing the backup file for the client, the backup agent 120 continues checking for the availability of the target storage.

If the target storage is available for storing a backup file for a client, the backup agent 120 transfers the backup file from the memory of a computer to the target storage. For example, the backup agent 120 transfers the backup file, and both metadata and a hash value associated with the backup file, from the part of the memory 122 of the server 108 to the storage array 110 when the blackout window expires for the storage array 110. The hash value enables the target storage to de-duplicate duplicate data in the backup file relative to data already stored in the target storage. For example, the hash value of the backup file for the laptop computer 102 enables the storage array 110 to determine if the storage array 110 already stored an identical backup file for the laptop computer 102 by comparing the recently received hash value to previously received hash values. After transferring all of the backup files stored in the part of the memory 122 to the storage array 110, the backup agent 120 informs the backup/restore application 118 about all of the transfers, and then terminates itself until the next blackout window is initiated for the storage array 110.

After a backup file is transferred from the memory of a computer to the target storage, the backup/restore application 118 can confirm that the target storage stored the backup file for a client. For example, the backup/restore application 118 confirms that the storage array 110 stored the backup file for the laptop computer 102.

After a backup file is transferred from the memory of a computer to the target storage, the backup/restore application 118 can update a database that lists backup files stored to the target storage, wherein the database enables restoration of any backup file to any client. For example, the backup/restore application 118 updates the database that lists backup files, backup operation schedules, and client configurations to indicate that the storage array 110 stored the backup file for the laptop computer 102, which enables the backup/restore application 118 to restore the backup file to the laptop computer 102 if required.

Since the backup agent 120 creates a checkpoint for the system 100 at the beginning of the blackout window for the storage array 110, and since the checkpoint is validated via a hierarchical file system, the backup agent 120 creates a valid rollback option for backup file restoration in case of failures for the clients 102-106. The system 100 does not have to wait until the blackout window is expired for the storage array to back up the clients 102-106. There is no downtime for the clients 102-106 to create backup files, and the customers who use the clients 102-106 do not have to take the blackout window for the storage array 110 into account when scheduling backup operations for the clients 102-106. The backup agent 120 overcomes the legacy problem of being unable to store backup files for the clients 102-106 during blackout windows for target storage.

Figure 2:
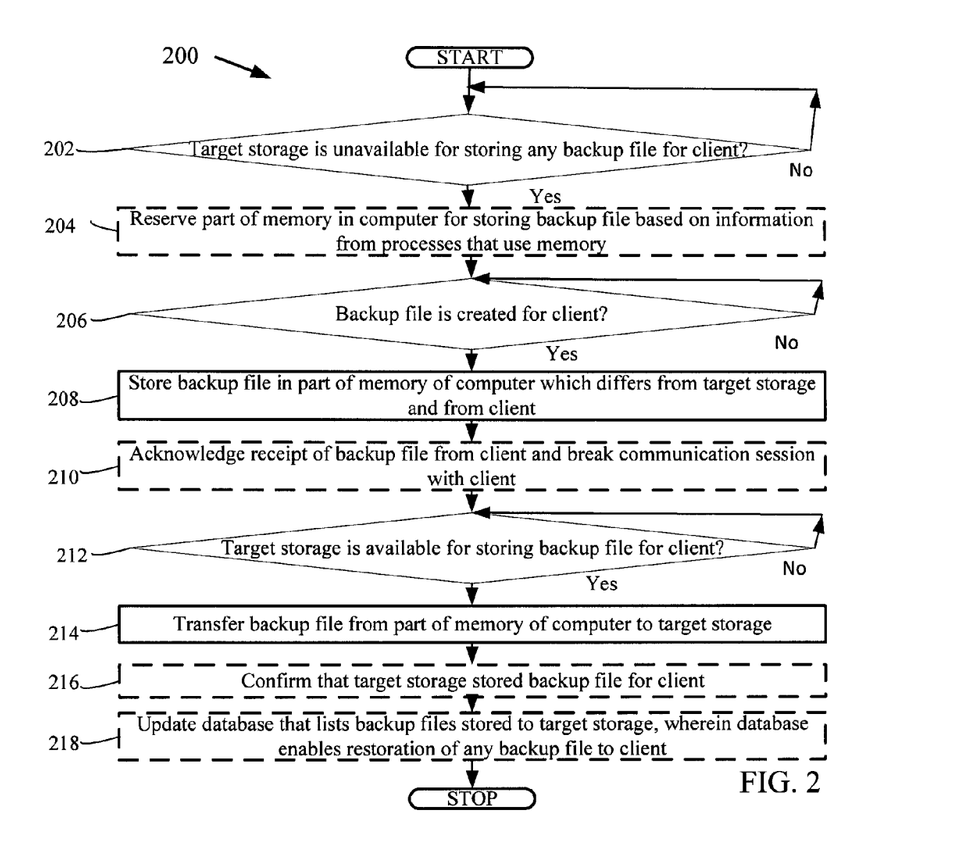
FIG. 2 is a flowchart that illustrates a method of handling backups when target storage is unavailable, under an embodiment.

FIG. 2 is a flowchart that illustrates a method for handling backups when target storage is unavailable, under an embodiment. Flowchart 200 illustrates method acts illustrated as flowchart blocks for certain steps involved in and/or between the clients 102-106 and/or the server 108 of FIG. 1.

A determination is made whether a target storage is unavailable for storing any backup file for a client, block 202. For example, the backup agent 120 determines whether a blackout window has begun for writing data to the storage array 110. If the target storage is unavailable for storing any backup file for the client, the flowchart 200 continues to block 204 to check for backup file creation. If the target storage is still available for storing any backup file for the client, the flowchart 200 returns to block 202 to continue checking for the target storage's unavailability for storing client backup files.

If the target storage is unavailable for storing any backup file for a client, a part of the memory in a computer is optionally reserved for storing a backup file based on information from processes that use the memory, block 204. For example, the backup agent 120 reserves enough of the memory 122 in the server 108 to enable the storing of a client backup file while retaining sufficient memory in the server 108 to maintain the functioning of other server processes.

If the target storage is unavailable for storing any backup file for a client, a determination is made whether a backup file is created for the client, block 206. For example, the backup agent 120 determines whether a backup file is created for the laptop computer 102 when the blackout window is in effect for the storage array 110. If a backup file is created for a client, the flowchart continues to block 208 to handle the created backup file. If a backup file is not created for a client, the flowchart returns to block 206 to continue checking for the creation of a backup file.

If a backup file is created for a client, the backup file is stored in a memory of a computer which differs from the target storage and the client, block 208. For example, the backup agent 120 stores the backup file in the part of the memory 122 of the server 108 that executes the backup agent 120 if the backup file is created for the laptop computer 102 when the blackout window is in effect for the storage array 110.

After a backup file is stored in a memory of a computer which differs from the target storage and a client, receipt of the backup file from the client is optionally acknowledged and a communication session with the client is optionally broken, block 210. For example, the backup agent 120 acknowledges receipt of a backup file from the laptop computer 102, and breaks the communication session via the encrypted channel with the laptop computer 102.

After a backup file is stored in a memory of a computer which differs from the target storage and a client, a determination is made whether the target storage is available for storing the backup file for the client, block 212. For example, the backup agent 120 determines whether the blackout window has expired for the storage array 110. If the target storage is available for storing the backup file for the client, the flowchart 200 continues to block 214 to transfer the backup file. If the target storage is still unavailable for storing the backup file for the client, the flowchart 200 returns to block 212 to continue checking for the availability of the target storage.

If the target storage is available for storing a backup file for a client, the backup file is transferred from the memory of a computer to the target storage, block 214. For example, the backup agent 120 transfers the backup file for the laptop computer 102 from the part of the memory 122 of the server 108 to the storage array 110 when the blackout window expires for the storage array 110.

After a backup file is transferred from the memory of a computer to the target storage, the target storage storing the backup file for a client is optionally confirmed, block 216. For example, the backup/restore application 118 confirms that the storage array 110 stored the backup file for the laptop computer 102.

After a backup file is transferred from the memory of a computer to the target storage, a database that lists backup files stored to the target storage is optionally updated, wherein the database enables restoration of any backup file to any client, block 218. For example, the backup/restore application 118 updates the database that lists backup files to indicate that the storage array 110 stored the backup file for the laptop computer 102, which enables the backup/restore application 118 to restore the backup file to the laptop computer 102 if required. The backup agent 120 overcomes the legacy problem of being unable to store backup files for clients during blackout windows for target storage Although FIG. 2 depicts the blocks 202-218 occurring in a specific order, the blocks 202-218 may occur in another order. In other implementations, each of the blocks 202-218 may also be executed in combination with other blocks and/or some blocks may be divided into a different set of blocks.

Figure 3:
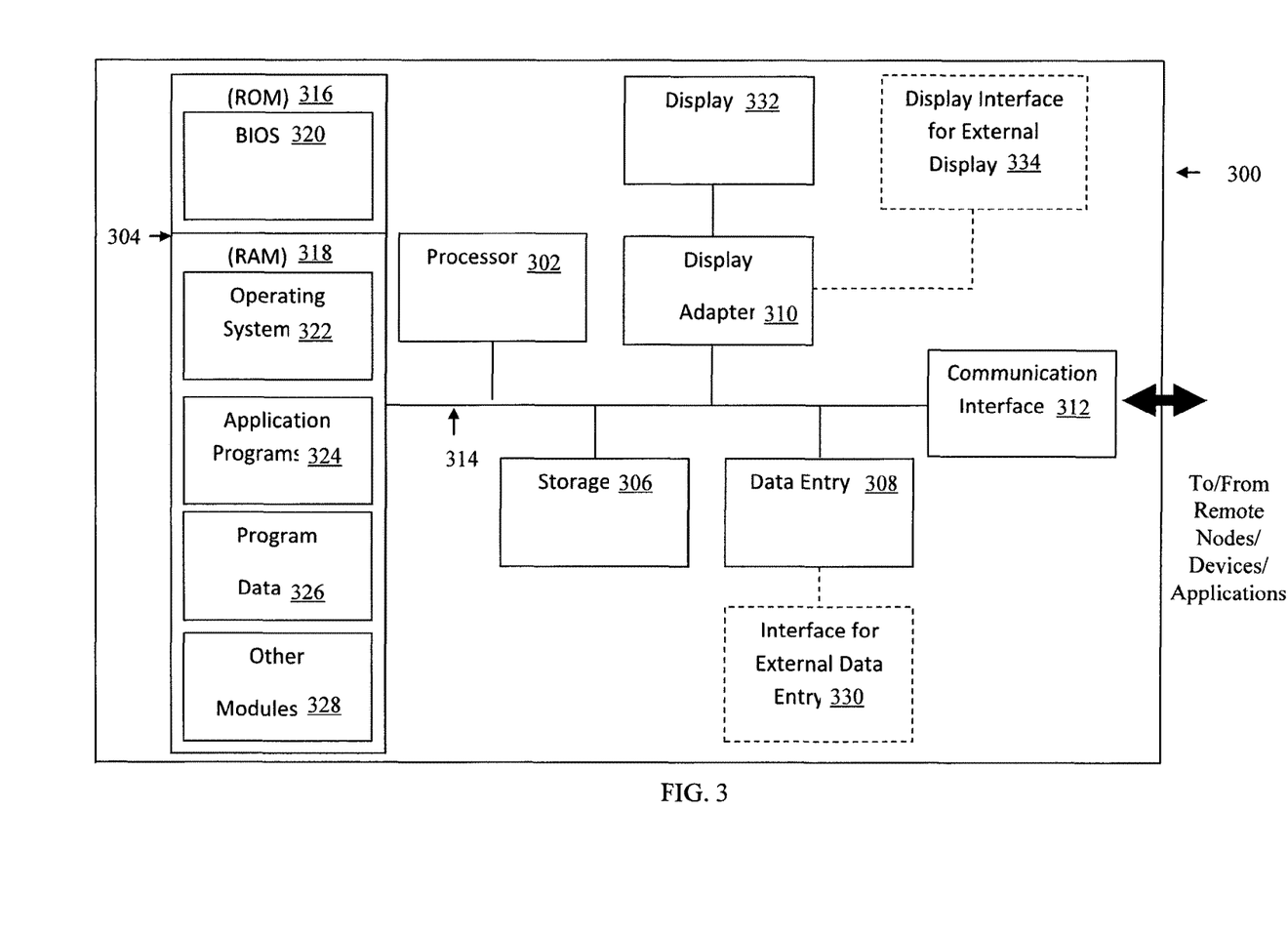
FIG. 3 is a block diagram illustrating an example hardware device in which the subject matter may be implemented.

Having describing the subject matter in detail, an exemplary hardware device in which the subject matter may be implemented shall be described. Those of ordinary skill in the art will appreciate that the elements illustrated in FIG. 3 may vary depending on the system implementation. With reference to FIG. 3, an exemplary system for implementing the subject matter disclosed herein includes a hardware device 300, including a processing unit 302, memory 304, storage 306, a data entry module 308, a display adapter 310, a communication interface 312, and a bus 314 that couples the elements 304-312 to the processing unit 302.

The bus 314 may comprise any type of bus architecture. Examples include a memory bus, a peripheral bus, a local bus, etc. The processing unit 302 is an instruction execution machine, apparatus, or device and may comprise a microprocessor, a digital signal processor, a graphics processing unit, an application specific integrated circuit (ASIC), a field programmable gate array (FPGA), etc. The processing unit 302 may be configured to execute program instructions stored in the memory 304 and/or the storage 306 and/or received via the data entry module 308.

The memory 304 may include read only memory (ROM) 316 and random access memory (RAM) 318. The memory 304 may be configured to store program instructions and data during operation of the hardware device 300. In various embodiments, the memory 304 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 304 may also include nonvolatile memory technologies such as nonvolatile flash RAM (NVRAM) or ROM. In some embodiments, it is contemplated that the memory 304 may include a combination of technologies such as the foregoing, as well as other technologies not specifically mentioned. When the subject matter is implemented in a computer system, a basic input/output system (BIOS) 320, containing the basic routines that help to transfer information between elements within the computer system, such as during start-up, is stored in the ROM 316.

The storage 306 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 300.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 306, the ROM 316 or the RAM 318, including an operating system 322, one or more applications programs 324, program data 326, and other program modules 328. A user may enter commands and information into the hardware device 300 through the data entry module 308. The data entry module 308 may include mechanisms such as a keyboard, a touch screen, a pointing device, etc. Other external input devices (not shown) are connected to the hardware device 300 via an external data entry interface 330. By way of example and not limitation, external input devices may include a microphone, joystick, game pad, satellite dish, scanner, or the like. In some embodiments, external input devices may include video or audio input devices such as a video camera, a still camera, etc. The data entry module 308 may be configured to receive input from one or more users of the hardware device 300 and to deliver such input to the processing unit 302 and/or the memory 304 via the bus 314.

A display 332 is also connected to the bus 314 via the display adapter 310. The display 332 may be configured to display output of the hardware device 300 to one or more users. In some embodiments, a given device such as a touch screen, for example, may function as both the data entry module 308 and the display 332. External display devices may also be connected to the bus 314 via an external display interface 334. Other peripheral output devices, not shown, such as speakers and printers, may be connected to the hardware device 300.

The hardware device 300 may operate in a networked environment using logical connections to one or more remote nodes (not shown) via the communication interface 312. The remote node may be another computer, a server, a router, a peer device or other common network node, and typically includes many or all of the elements described above relative to the hardware device 300. The communication interface 312 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 312 may include logic configured to support direct memory access (DMA) transfers between the memory 304 and other devices.

In a networked environment, program modules depicted relative to the hardware device 300, or portions thereof, may be stored in a remote storage device, such as, for example, on a server. It will be appreciated that other hardware and/or software to establish a communications link between the hardware device 300 and other devices may be used.

It should be understood that the arrangement of the hardware device 300 illustrated in FIG. 3 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of the hardware device 300.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 3.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for handling backups when target storage is unavailable, the system comprising:
    a computer having one or more processors; and
    a non-transitory computer-readable medium storing a processor-based application, which when executed on the computer, causes the one or more processors to:
        determine whether a target storage is unavailable, the target storage being unavailable when the target storage is in a write-only mode, the write-only mode preventing a client from storing any backup file to the target storage and allowing the client to restore any stored backup file from the target storage, the target storage being different from the computer and different from the client;
        determine, in response to a determination that the target storage is unavailable, whether a backup file has been created by the client, the backup file having been created during a time period when the target storage has been unavailable;
        store the backup file in a memory of the computer in response to a determination that the backup file has been created for the client during the time period when the target storage was unavailable;
        determine whether the target storage is available for storing the backup file for the client after the backup file has been stored in the memory of the computer, the target storage being available when the target storage is not in a write-only mode; and
        transfer the backup file from the memory of the computer to the target storage in response to a determination that the target storage is available for storing the backup file for the client.

2. The system of claim 1, wherein the processor-based application further causes the one or more processors to reserve a part of the memory in the computer for storing the backup file based on information from processes that use the memory.

3. The system of claim 1, wherein determining whether the backup file is created by the client comprises requesting the client to provide the backup file via an encrypted channel.

4. The system of claim 1, wherein the processor-based application further causes the one or more processors to acknowledge receipt of the backup file from the client and to break a communication session with the client.

5. The system of claim 1, wherein transferring the backup file from the memory of the computer to the target storage comprises transferring a hash value associated with the backup file to the target storage, wherein the hash value enables the target storage to de-duplicate duplicate data in the backup file relative to data already stored in the target storage.

6. The system of claim 1, wherein the processor-based application further causes the one or more processors to confirm that the target storage stored the backup file for the client.

7. The system of claim 1, wherein the processor-based application further causes the one or more processors to update a database that lists backup files stored to the target storage, wherein the database enables a restoration of any backup file to the client.

8. A computer-implemented method for handling backups when target storage is unavailable, the method comprising:
    determining whether a target storage is unavailable, the target storage being unavailable when the target storage is in a write-only mode, the write-only mode preventing a client from storing any backup file to the target storage and allowing the client to restore any stored backup file from the target storage, the target storage being different from the computer and different from the client;
    determining, in response to a determination that the target storage is unavailable, whether a backup file has been created by the client, the backup file having been created during a time period when the target storage has been unavailable;
    storing the backup file in a memory of the computer in response to a determination that the backup file has been created by the client during the time period when the target storage was unavailable;
    determining whether the target storage is available for storing the backup file for the client after the backup file has been stored in the memory of the computer, the target storage being available when the target storage is not in a write-only mode; and
    transferring the backup file from the memory of the computer to the target storage in response to a determination that the target storage is available for storing the backup file for the client.

9. The method of claim 8, wherein the method further comprises reserving a part of the memory in the computer for storing the backup file based on information from processes that use the memory.

10. The method of claim 8, wherein determining whether the backup file is created by the client comprises requesting the client to provide the backup file via an encrypted channel.

11. The method of claim 8, wherein the method further comprises acknowledging receipt of the backup file from the client and breaking a communication session with the client.

12. The method of claim 8, wherein transferring the backup file from the memory of the computer to the target storage comprises transferring a hash value associated with the backup file to the target storage, wherein the hash value enables the target storage to de-duplicate duplicate data in the backup file relative to data already stored in the target storage.

13. The method of claim 8, wherein the method further comprises confirming that the target storage stored the backup file for the client.

14. The method of claim 8, wherein the method further comprises updating a database that lists backup files stored to the target storage, wherein the database enables a restoration of any backup file to the client.

15. A computer program product, comprising a non-transitory computer-readable medium having a computer-readable program code embodied therein to be executed by one or more processors, the program code including instructions to:
   determine whether a target storage is unavailable, the target storage being unavailable when the target storage is in a write-only mode, the write-only mode preventing a client from storing any backup file to the target storage and allowing the client to restore any stored backup file from the target storage, the target storage being different from the computer and different from the client;
   determine, in response to a determination that the target storage is unavailable, whether a backup file has been created by the client, the backup file having been created during a time period when the target storage has been unavailable;
   store the backup file in a memory of the computer in response to a determination that the backup file has been created for the client during the time period when the target storage was unavailable;
   determine whether the target storage is available for storing the backup file for the client after the backup file has been stored in the memory of the computer, the target storage being available when the target storage is not in a write-only mode; and
   transfer the backup file from the memory of the computer to the target storage in response to a determination that the target storage is available for storing the backup file for the client.

16. The computer program product of claim 15, wherein the program code includes further instructions to reserve a part of the memory in the computer for storing the backup file based on information from processes that use the memory.

17. The computer program product of claim 15, wherein determining whether the backup file is created by the client comprises requesting the client to provide the backup file via an encrypted channel.

18. The computer program product of claim 15, wherein the program code includes further instructions to acknowledge receipt of the backup file from the client and to break a communication session with the client.

19. The computer program product of claim 15, wherein transferring the backup file from the memory of the computer to the target storage comprises transferring a hash value associated with the backup file to the target storage, wherein the hash value enables the target storage to de-duplicate duplicate data in the backup file relative to data already stored in the target storage.

20. The computer program product of claim 15, wherein the program code includes further instructions to confirm that the target storage stored the backup file for the client, and to update a database that lists backup files stored to the target storage, wherein the database enables a restoration of any backup file to the client.

* * * * *